No. 644,604. Patented Mar. 6, 1900.
I. C. IMBODEN.
COMBINED HARROW AND ROLLER.
(Application filed Oct. 27, 1899.)
(No Model.) 2 Sheets—Sheet 1.
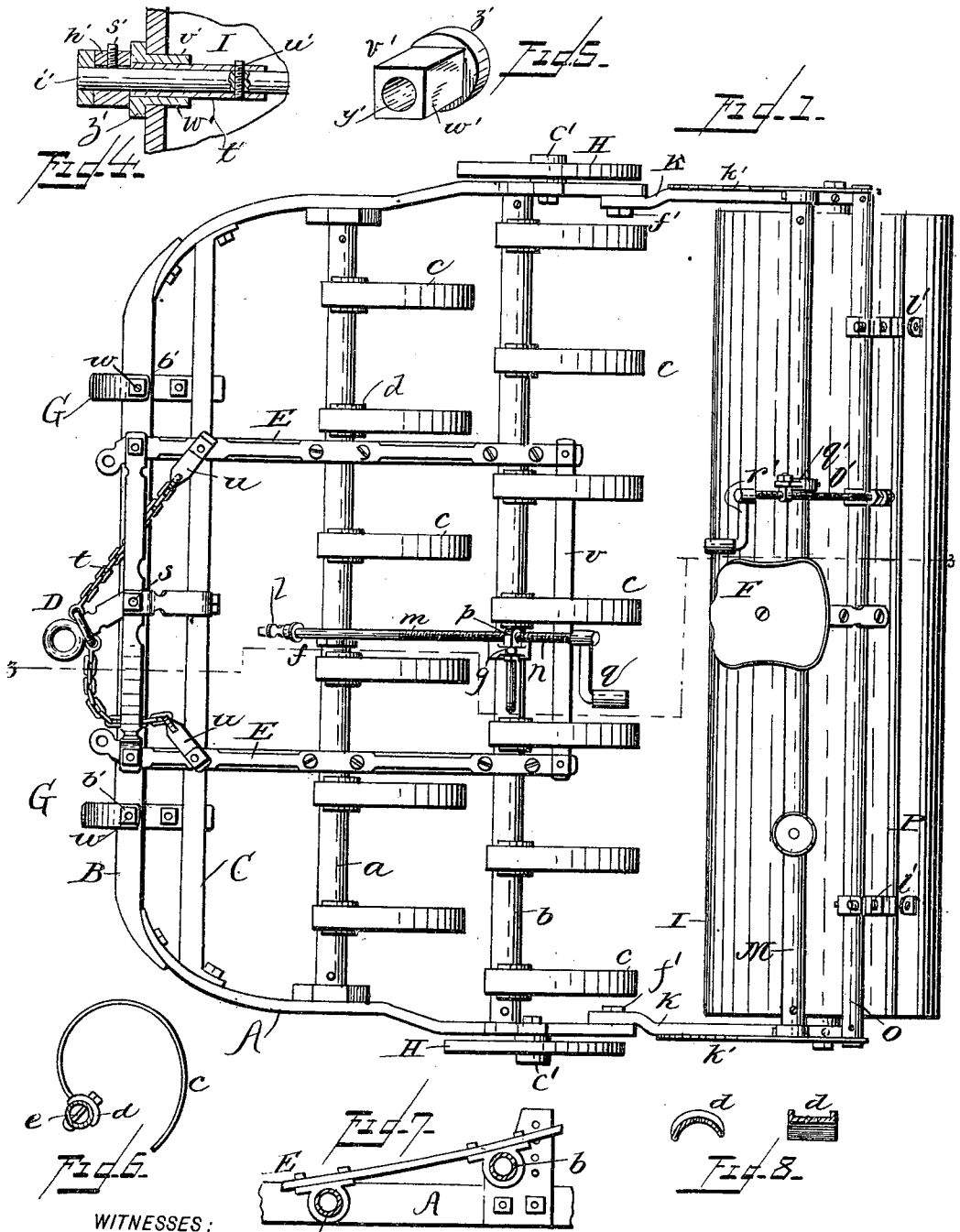
WITNESSES:
Franck L. Ourand.
W. Parker Reinohl.
INVENTOR
Isaac C. Imboden.
BY
D. C. Reinohl
ATTORNEY No. 644,604. Patented Mar. 6, 1900.
I. C. IMBODEN.
COMBINED HARROW AND ROLLER.
(Application filed Oct. 27, 1899.)
(No Model.) 2 Sheets—Sheet 2.
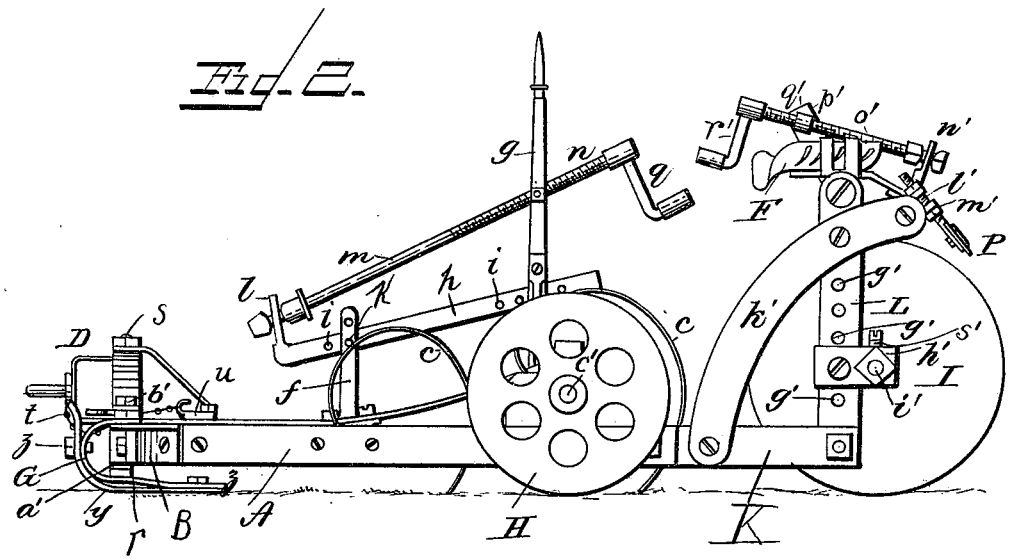
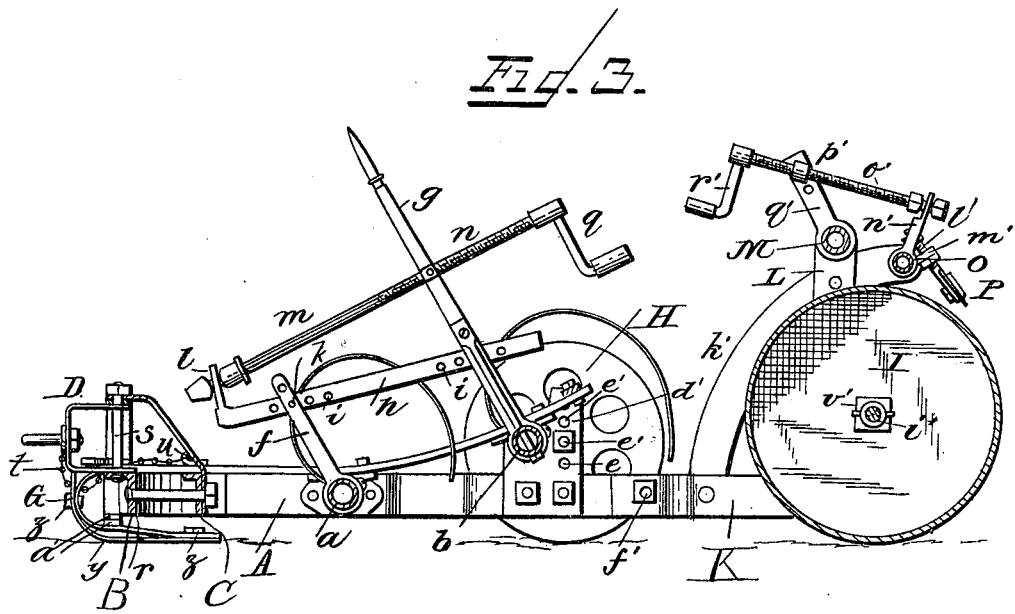
WITNESSES:
INVENTOR
Isaac C. Imboden.
BY
D. R. Reinohl.
ATTORNEY
THE NORRIS PETERS CO., PHOTO-LITHO., WASHINGTON, D. C.

ered by any desired degree by means of a
UNITED STATES PATENT OFFICE.

ISAAC C. IMBODEN, OF CAMPBELLTOWN, PENNSYLVANIA.

COMBINED HARROW AND ROLLER.

SPECIFICATION forming part of Letters Patent No. 644,604, dated March 6, 1900.

Application filed October 27, 1899. Serial No. 734,921. (No model.)

*To all whom it may concern:*

Be it known that I, ISAAC C. IMBODEN, a citizen of the United States, residing at Campbelltown, in the county of Lebanon and State of Pennsylvania, have invented certain new and useful Improvements in a Combined Harrow and Roller; and I do hereby declare the following to be a full, clear, and exact description of the invention, such as will enable others skilled in the art to which it appertains to make and use the same.

My invention relates to agricultural implements such as are used in preparing soil for sowing, has especial reference to harrows and rollers, and consists in certain improvements in construction which will be fully disclosed in the following specification and claims.

In the accompanying drawings, which form part of this specification, Figure 1 represents a top plan view of my invention; Fig. 2, a side elevation of the same; Fig. 3, a vertical section on the line 3 3, Fig. 1; Fig. 4, a detail sectional view of the roller-shaft bearing; Fig. 5, a perspective of the bearing-box; Fig. 6, a side elevation of one of the teeth secured to the bar; Fig. 7, a detail showing one of the brace-bars connected to the teeth-bars, and Fig. 8 a detail of the saddle in which the inner end of the tooth rests.

Reference being had to the drawings and the letters thereon, A indicates the frame of the harrow, on which are pivotally supported transverse tooth-bars $a\,b$, to which the spring-teeth $c$ are connected by an interposed saddle $d$ at the heel of the teeth and a bolt $e$, passing through the bar, the saddle, and the teeth, and the teeth are adjusted to embed in the soil to any desired degree by means of a lever $f$, connected to the tooth-bar $a$, and a harrow-raising lever $g$, connected to the tooth-bar $b$, a bar $h$, which is provided with holes $i$ at each end for varying the angle of the levers $f$ and $g$ by adjustment thereon to vary the depth that the teeth shall embed in the soil, which bar is connected to said levers by bolts $k\,k$, and the bar $h$ is provided with an upturned arm $l$, to which the front end of an operating-rod $m$ is connected. The rod $m$ is externally screw-threaded at $n$ and engages a fixed nut $p$, secured to the lever $g$, and is supported therein and is provided with a crank $q$ for revolving the rod and adjusting the teeth regularly and without danger of suddenly projecting them into the soil to a depth beyond that desired.

Across the front of the frame and forming part thereof is a bar B, having a vertical member $r$, which forms a clod-crusher, and in rear of said bar is another transverse bar C for the same purpose and between which bars the clods are caught and revolve until they pass under the rear bar and are crushed.

D is the clevis, which is secured to a bolt $s$ and is provided with stay-chains $t\,t$, which are connected to hooks $u\,u$, bolted to the frame, so that in drawing the harrow at an angle in turning or otherwise the draft is upon one or the other of the chains $t$.

E E are brace-bars secured to the bars B C and to the tooth-bars $a\,b$ to stiffen them and prevent springing between their end bearings in the frame A, and $v$ a foot-rest for the driver, who sits upon the seat F.

The harrow is provided with sleds G G, which are pivotally secured to the bar B by a bolt $w$, so that they may turn freely as the harrow is drawn in a curved line or a circle, and are provided with detachable shoes $y$, secured by bolts $z$, so that they may be readily renewed when worn. The sleds are vertically adjustable by removing the washers $a'$ from the lower end of the bolt $w$ and placing them on the upper end of the bolt under the nut $b'$.

H H are wheels upon which the frame of the harrow is supported, and the wheels are supported upon short axles $c'$, which are vertically adjustable in brackets $d'$, having holes $e'$, as shown in Fig. 3, to throw the wheels out of engagement with the soil and prevent leaving tracks across a field when the harrow is at work.

I is a roller whose frame K is pivotally connected to the frame A of the harrow by bolts $f'\,f'$ to admit of the roller rising and falling over hollow places to prevent the rear harrow-teeth pushing into the soil or ground and bending the teeth. From the frame K rise vertical arms L, having holes $g'$, in which the bearings $h'$ of the roller-axle $i'$ are vertically adjustable to raise and lower the roller in relation to its frame and the frame of the harrow to accommodate the feet of the driver with reference to the foot-rest $v$.

Crossing the roller and supported in the arms L is a fixed rod or bar M, upon which the seat F is supported, and a bar O is pivotally supported in arms k' and to which the scraper P is adjustably attached by screw-bolts l', engaging brackets m' on the bar O. To the bar O is attached a lever n', which is engaged by a screw-threaded operating-rod o', which engages a nut p', secured to a bracket q' on the bar M, and is provided with a crank r', by which the rod o' is operated and the scraper P brought to bear upon the periphery of the roller to remove any soil that may adhere to it. The scraper is reversible, so that when worn from one edge it may be detached and turned with the opposite edge in position to operate upon the dirt adhering to the roller.

The roller-axle is held against rotation by screws s' in the bearings h', and the roller revolves freely upon the axle, and an axle-bearing is formed by a sleeve t', secured around the axle by a screw u', and a box v', having a square body w', which enters the end of the roller and is provided with a cylindrical bore y', which slips over the sleeve t', and a collar z', which limits the distance the box is driven into the end of the roller and also serves to exclude dust or dirt from the bearing.

Having thus fully described my invention, what I claim is—

1. A harrow having teeth secured to pivoted bars supported in the frame of the harrow, levers attached to said bars, a bar connecting said levers, and an operating-rod externally screw-threaded engaging the bar connecting the levers; in combination with a nut on one of said levers engaged by the screw-threaded portion of the operating-rod and supported thereby.

2. A harrow having teeth secured to bars pivotally supported in the frame of the harrow, levers attached to said bars, a bar adjustably connected to said levers and having an upturned member at its front end, and an operating-rod externally screw-threaded and connected to said bar; in combination with a fixed nut supported on the harrow-raising lever and engaged by the screw-threaded portion of the operating-rod.

3. A harrow having a plurality of vertical clod-crushing bars forming part of the frame thereof and between which the clods may revolve, and a series of harrow-teeth in rear of the bars; in combination with a roller adjustably connected to the rear end of the frame of the harrow to move vertically.

4. A harrow having a plurality of parallel clod-crushing bars secured to and within the frame thereof and between which the clods may revolve, and a series of harrow-teeth in rear of said bars; in combination with a roller pivotally connected to the rear end of the frame of the harrow to move vertically.

5. A harrow having a clod-crushing device forming part of the frame thereof, and a series of teeth in rear of said crusher; in combination with a roller vertically adjustable in its frame and said frame pivotally connected to the frame of the harrow.

6. A harrow having adjustable teeth, tooth-bars pivotally supported in the frame of the harrow, a screw-threaded operating-rod extending rearward and connected to said bars, and a roller connected to the frame of the harrow; in combination with a scraper supported by the frame of the roller, adjustable thereon and a screw-threaded operating-rod connected to the scraper.

7. A harrow; in combination with a roller secured to the frame of the harrow and having a frame provided with a transverse fixed bar and a transverse pivoted bar, a scraper supported by the latter bar and adjustably secured thereto, and a screw-threaded operating-rod for said scraper.

8. A roller having a shaft supported at each end in a bearing secured to the frame of the roller; in combination with a sleeve surrounding the shaft and secured thereon, and a box surrounding said sleeve and having a collar at one end and a square body provided with a cylindrical bore and secured in the end of the roller.

In testimony whereof I affix my signature in presence of two witnesses.

ISAAC C. IMBODEN.

Witnesses:
A. W. BRANDT,
H. H. BRANDT.